US006969105B2

(12) United States Patent
Rincoe

(10) Patent No.: US 6,969,105 B2
(45) Date of Patent: Nov. 29, 2005

(54) EXTENDIBLE BAY ASSEMBLY AND METHOD FOR HABITATS INCLUDING RECREATIONAL VEHICLES

(75) Inventor: Richard G. Rincoe, Golden, CO (US)

(73) Assignee: RV Safety Products, LLC, Lakewood, CO (US)

( * ) Notice: Subject to any disclaimer, the term of this patent is extended or adjusted under 35 U.S.C. 154(b) by 0 days.

(21) Appl. No.: 10/824,992

(22) Filed: Apr. 14, 2004

(65) Prior Publication Data

US 2005/0230990 A1   Oct. 20, 2005

(51) Int. Cl.[7] .............................................. B60P 3/34
(52) U.S. Cl. .............................. 296/26.13; 296/26.01; 296/165; 52/67
(58) Field of Search ................ 296/26.13, 26.09, 296/26.12, 26.01, 165, 171, 172, 175

(56) References Cited

U.S. PATENT DOCUMENTS

| | | | | |
|---|---|---|---|---|
| 5,011,216 A | * | 4/1991 | Baughman | 296/165 |
| 5,902,001 A | * | 5/1999 | Schneider | 296/26.13 |
| 6,108,983 A | * | 8/2000 | Dewald et al. | 296/26.13 |
| 6,293,612 B1 | * | 9/2001 | Crean | 296/26.13 |
| 6,623,058 B1 | * | 9/2003 | Crean | 296/26.13 |
| 6,637,804 B1 | * | 10/2003 | Crean | 296/26.13 |
| 6,729,669 B2 | * | 5/2004 | McManus et al. | 296/26.13 |
| 6,783,164 B2 | * | 8/2004 | Bortell | 296/26.13 |
| 2001/0030437 A1 | * | 10/2001 | Hiebert et al. | 296/26.13 |
| 2002/0084661 A1 | * | 7/2002 | McManus et al. | 296/26.01 |
| 2002/0089213 A1 | * | 7/2002 | Gehman et al. | 296/26.13 |
| 2004/0066060 A1 | * | 4/2004 | Rasmussen | 296/165 |
| 2004/0130172 A1 | * | 7/2004 | Yoder et al. | 296/26.13 |
| 2004/0160074 A1 | * | 8/2004 | Shea | 296/26.13 |
| 2004/0183323 A1 | * | 9/2004 | Blodgett, Jr. | 296/26.01 |

* cited by examiner

Primary Examiner—Kiran B. Patel
(74) Attorney, Agent, or Firm—Timothy J. Martin; Michael R. Henson; Rebecca A. Gegick

(57) ABSTRACT

An extendable bay for use with a human habitat, such as a slide-out for a recreational vehicle, includes a compartment sized to be received in an opening in the habitat's side wall. The compartment has a bottom, a top, a front panel and a pair of side panels. A cantilever portion extends from the top for a distance beyond the first and second side panels. A lower edge bearing is interposed between the lower edge of the opening and the bottom of the compartment. A cantilever bearing element is interposed between the cantilever portion and the ceiling of the habitat to support the cantilever portion against the ceiling for sliding movement. An automated drive may be provided to extend and retract the bay. Side bearing elements may be provided. Seal strips may also be used to seal the bay relative to the environment.

46 Claims, 5 Drawing Sheets

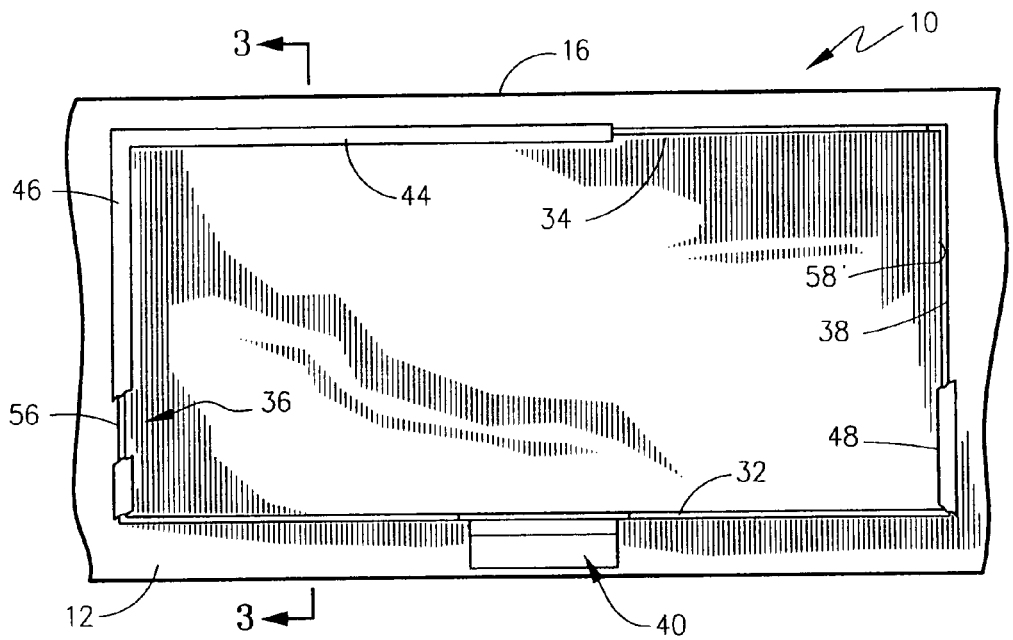
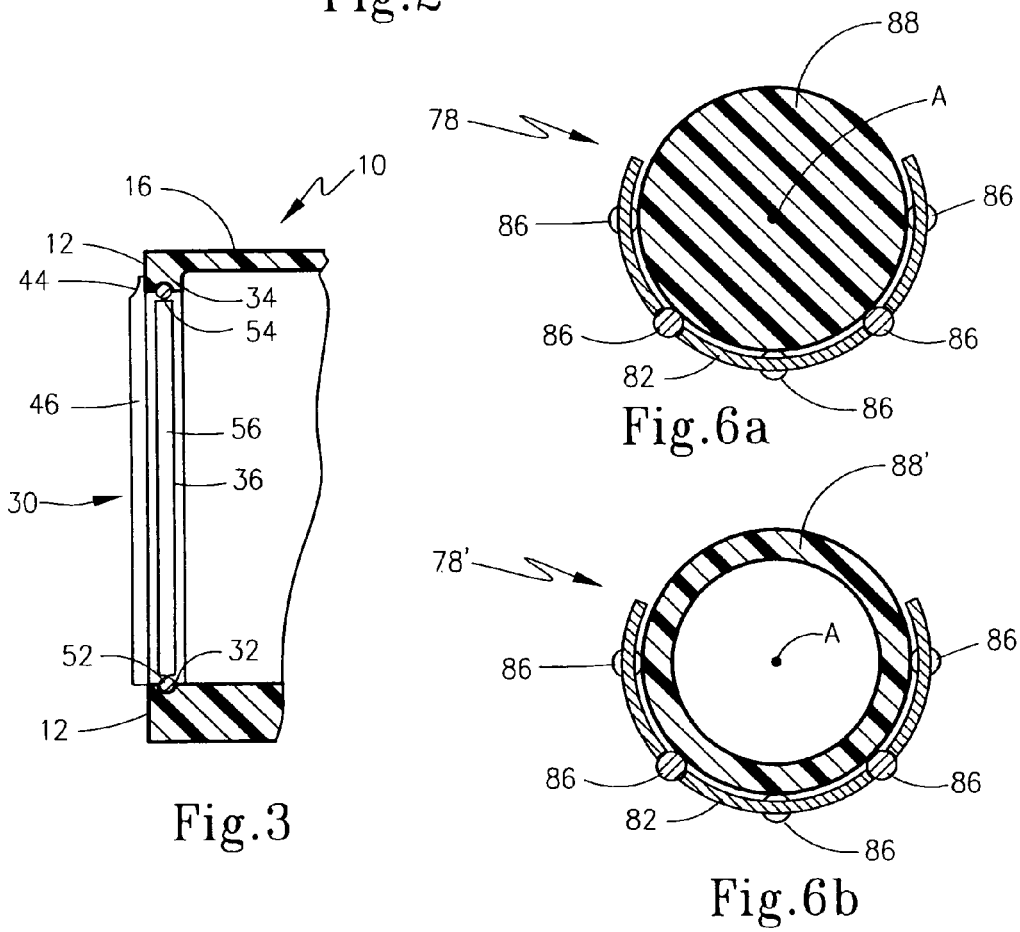

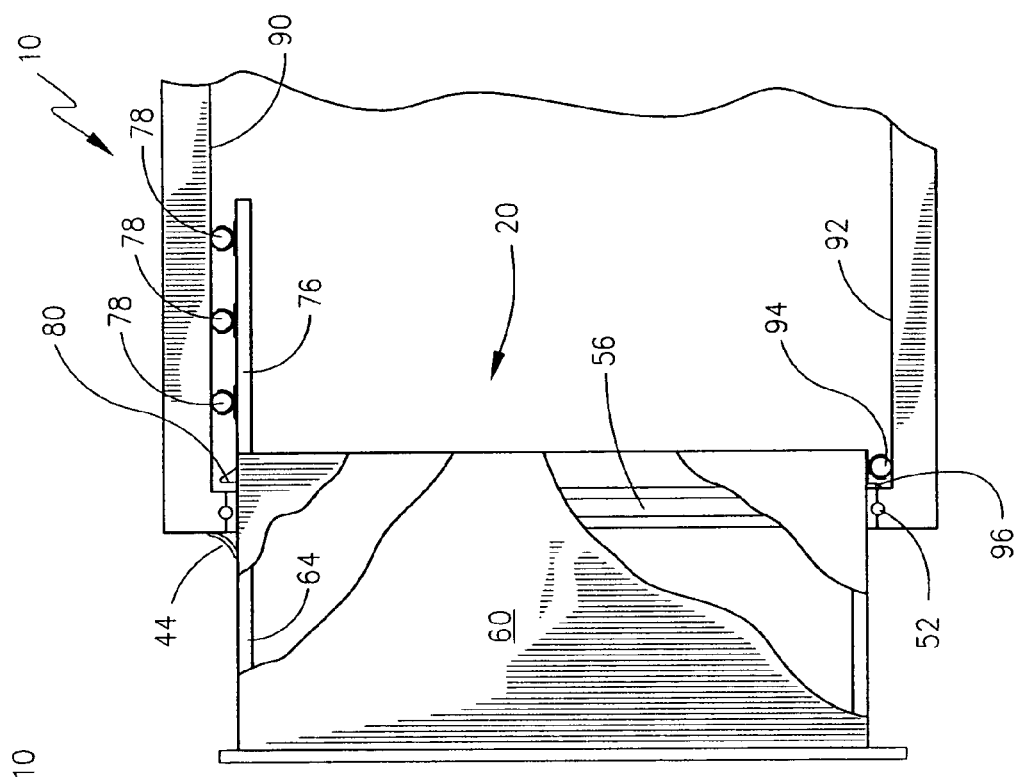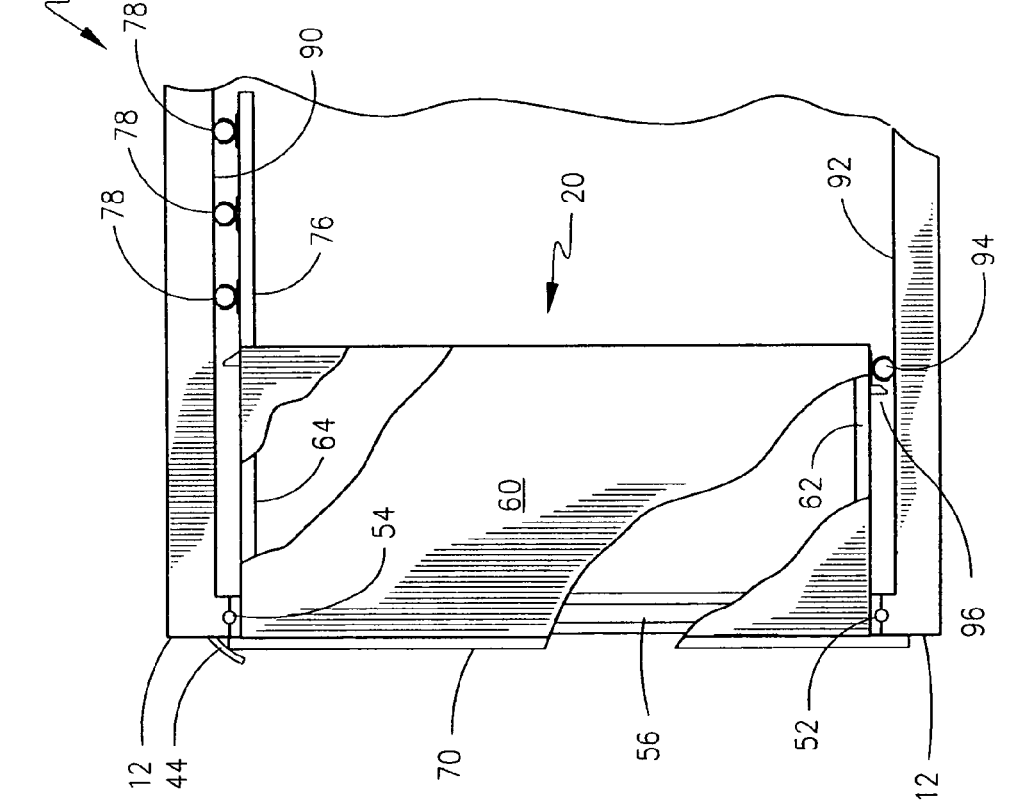

EXTENDIBLE BAY ASSEMBLY AND METHOD FOR HABITATS INCLUDING RECREATIONAL VEHICLES

FIELD OF THE INVENTION

The present invention broadly relates to structures that form part of a living space for persons, including homes or other structures. The present invention particularly concerns structural spaces that may be incorporated into mobile homes, recreational vehicles and the like. The present invention is specifically directed to an extendible bay assembly especially adapted for use with motor homes and recreational vehicles.

BACKGROUND OF THE INVENTION

The availability of adequate shelter is one of the fundamental needs of a substantial portion of the human population. Not only does such a shelter need to protect the occupants from the elements, but also such shelter must provide sufficient space for various activities to be conducted therein. Accordingly, many people desire to maximize their living space so as to accommodate their varied needs. Not all shelters or habitats, however, are permanent dwellings.

Since the beginning of recorded history, many nomadic tribes have traveled from place to place and have carried with them portable shelters in the form of tents and the like. With the development of seafaring vessels, habitats for the crew were built as a permanent structure on the sailing ship. During the homesteading of the American west, pioneers traveled in wagons that not only carried their possessions but also provided shelter in the form of a mobile dwelling.

In more modern times, people are known to live in mobile homes which may be transported from one location to another as a mobile dwelling. One branch of the mobile habitat industry is known as the recreational vehicle industry. For many years, recreational traveling has enjoyed popularity among a wide spectrum of the population.

A concern for any traveler, naturally, is the need to provide for basic need such as food, shelter, and water as noted above. A significant portion of the hotel/motel industry caters to the travelers needs for shelter while the restaurant provides the availability of food and drink. Despite the availability of overnight accommodations and restaurant facilities, many travelers seek alternative accommodations either as a lifestyle preference or as a money saving measure. Also, convenient lodging is not always available at target recreation sites so that alternative accommodations must be made. Here, many travelers prefer to use their own accommodations that they transport with them. Accordingly, many travelers opt for portable accommodations in the form of tents, recreational vehicles and travel trailers.

While such recreational vehicles offer the convenience of on-hand shelter, a common drawback is the living area available to the occupants. For example, camper shells fit on the bed of a pick-up truck typically provide a single small room with an over-the-cab bed area. Pop-up tent trailers again provide a single room but are known to have extendible ends that may be erected upon reaching a destination to increase the size over the footprint of its trailer. Larger recreational vehicles and fifth-wheel recreational trailers can offer up to several rooms of accommodations.

A common drawback, however, of all of these recreational vehicles is the available width of the living space. Since these vehicles are designed to be either driven or towed on highways, the dimensions while being driven or towed must comply with governmental regulations. Accordingly, the rooms in such vehicles are typically very narrow regardless of the length of the recreational vehicle.

In order to provide wider living spaces, it is known to construct extendible bays, which are sometimes referred to as slide-outs, as part of a recreational vehicles, whether a tent trailer, self propelled vehicle, fifth-wheel trailer or the like. Typically, these extendible bays are located on the sides of the vehicle. While traveling, the bays are held in a retracted position so that their sidewalls are located inside of the vehicle and with a front wall flush to the side of the vehicle. Upon arriving at a destination, however, the bays may be extended two to three feet away from the vehicle so as to increase the width of the living area. If the extendible bays are provided on both sides of the vehicles, this can add as much as six feet to the width of the vehicle. Thus, such extendible bays are valued by traveling enthusiasts.

Several problems are prevalent with existing extendible bays. Typically, extendible bays are supported by rails underneath the body of the compartment and the extension and retraction of such bays are accomplished by rack and pinion gear systems. Due to the torque forces created when the bays are extended, the support mechanisms may be distorted. Indeed, the rack gears on the rack and pinion gear systems may become twisted due to the torque forces. In severe cases, such twisting can cause the pinion gears to slip relative to the rack gears which unevenly drives the bays between the extended and the retracted states. This can create a jamming of the bay as well as damage to the sidewalls. In addition, should the vehicle turn at a small radius during travel, the extendible bay may inadvertently slide from the retracted position to the extended position.

Since the attractive features of extendible bays for recreational vehicles remain in demand, there is a need for improved structures that can function with extendible bays to eliminate various problems attended therewith. This need has existed since the advent of extendible bays. The present invention addresses these needs.

SUMMARY OF THE INVENTION

It is an object of the present invention to provide a new and useful extendible bay assembly and method that increases the usable living space in a habitat, such as a recreational vehicle.

It is another object of the present invention to provide and extendible bay system that is easy to operate.

Another object of the present invention is to provide an extendible bay assembly that is constructed so as to reduce the likelihood of compromise to the structural integrity thereof.

According to the present invention, then, an extendible bay assembly is provided for human habitat wherein the habitat includes a ceiling and an upright sidewall and wherein the sidewall has an opening therein which has a lower edge, an upper edge and first and second side edges. The extendible bay includes a compartment that is sized and adapted to be received in the opening in the sidewall when in an assembled state. The compartment has a compartment interior that includes a bottom, a top, a front panel and first and second spaced apart side panels. The side panels extend from the front panel to define a compartment depth with a dimension between the side panels defining a compartment width, and a dimension between the top and bottom defining a compartment height. The top of the compartment includes a cantilever portion that extends a distance beyond the first and second side panels. The extendible bay assembly includes a lower edge bearing interposed between the lower edge of the opening and bottom of the compartment when the compartment is in the assembled state. The lower edge bearing is operative to support the compartment relative to the lower edge of the opening for sliding movement out of and into the habitat. A cantilever bearing element is interposed between the cantilever portion of the top and ceiling of the habitat when the compartment is in the assembled state, and the cantilever bearing is operative to support the cantilever portion against the ceiling for sliding movement between a retracted position wherein the compartment is stored in the habitat and an extended position wherein the compartment extends outwardly of the habitat.

A drive assembly may optionally be provided which is associated with the compartment and the habitat; with the drive assembly is operative to mechanically move the compartment between the retracted and extended positions. The drive assembly may be selected from a group consisting of: an articulating arm drive, a hydraulic drive, a rack and pinion drive, a screw drive or other mechanical drives. Here, the sidewall of the vehicle may include a recess therein which has an entryway. The drive assembly is then disposed in the recess. A drive bracket is disposed on the compartment, and the drive assembly is secured to the drive bracket. The drive bracket may be configured to be received in the entryway thereby to enclose the drive assembly in the recess when in the retracted position.

In the disclosed embodiments, the compartment is generally rectangular in configuration so that the first and second side panels are substantially parallel to one another and so that the top and bottom are substantially parallel to one another. The top of the compartment may be defined by a top panel. Here, the cantilever portion is formed as an integral, one-piece extension of the top panel. An upper seal strip may extend along an upper edge of the opening so as to be positioned to slidably engage the top as the compartment is moved between the retracted and extended position. Also, first and second side seal strips may be provided to extend, respectively, along first and second side edges of the opening. The side seal strips are positioned to slidably engage the side panels as the compartment is moved between the retracted and extended positions.

In addition to the lower edge bearing the exemplary embodiments employ an upper edge bearing element interposed between the upper edge of the opening and the top of the compartment as well as side bearing elements that are interposed between the side panels and the first and second side edges of the openings when the compartment is in the received state. Thus, the compartment is surrounded on its four edges by bearings. Each of these bearings extend, respectively along a majority of the compartment width and a majority of the compartment height. Each bearing may be formed by an elongated channel frame and a cylindrical rod received in the channel frame and supported therein by roller bearings. Similarly, the cantilever-bearing element can extend along a majority of the compartment width and also include a channel frame and an elongated rod supported by roller bearings. Moreover, in the exemplary embodiment, a plurality of cantilever bearing elements are provided and are mounted on the cantilever portion in substantially parallel, spaced apart relation to one another. A bottom bearing may support the compartment relative to the floor.

The present invention also contemplates a method for supporting a slide-out compartment in a recreational vehicle including any of the steps inherent in the structure described above. Broadly, the method includes providing a cantilever structure associated with the top of the compartment so that the cantilever structure extends along the ceiling of the vehicle and slideably supporting the cantilever structure against the ceiling as the compartment is moved between the retracted and extended positions. In the method, the step of slideably supporting the cantilever structure may be accomplished by rollably supporting the cantilever structure relative to the ceiling. The method may also include the step of rollably supporting the bottom of the compartment relative to the lower edge of the opening and may include the step of rollably supporting the first and second side panels of the compartment relative to the first and second side edges of the opening. Moreover, the method may include the step of rollably supporting the bottom of the compartment relative to the floor of the vehicle. The method may also include the step of mechanically driving the compartment between the extended and retracted positions.

These and other objects of the present invention will become more readily appreciated and understood from a consideration of the following detailed description of the exemplary embodiments of the present invention when taken together with the accompanying drawings, in which:

BRIEF DESCRIPTION OF THE DRAWINGS

FIG. 2 is a front view in elevation, partially broken away, showing the extendible bay assembly of the present invention in a retracted position;

FIG. 3 is a cross-sectional view taken about lines 3—3 of FIG. 2;

FIG. 6(*a*) is an end view in cross-section showing the bearing element of FIG. 5 and FIG. 6(*b*) is an end view in cross-section similar to FIG. 6(*a*), but showing an alternative construction of the bearing element;

FIG. 7(*a*) is an end view in partial cross-section and partially broken away showing the extendible bay assembly of FIG. 1(*a*) in the retracted position, and FIG. 7(*b*) is an end view in partial cross-section and partially broken away showing the extendible bay of FIG. 1(*b*) in the extended position;

DETAILED DESCRIPTION OF THE EXEMPLARY EMBODIMENTS

The present invention broadly concerns living spaces and habitats, especially for humans. As used herein, "habitat" refers to a wide variety of spaces employed by persons in day-to-day lives. These include both permanent structures, such as homes, offices and the like as well as mobile structures such as mobile homes, motor homes, recreational vehicles (RV's) and the like. Moreover, the term "recreational vehicle" may include any of a wide variety of self propelled or towed recreational habitats such as motor homes, fifth-wheel trailers, goose-neck trailers, camper shells, pop-up campers, tent trailers, etc. The present invention is specifically directed to an extendible bay assembly for these habitats which extendible bay assembly is adapted to mount into an opening in a sidewall of the habitat with the extendible bay being supported, in a cantilever manner, against the ceiling.

Figure 1A:
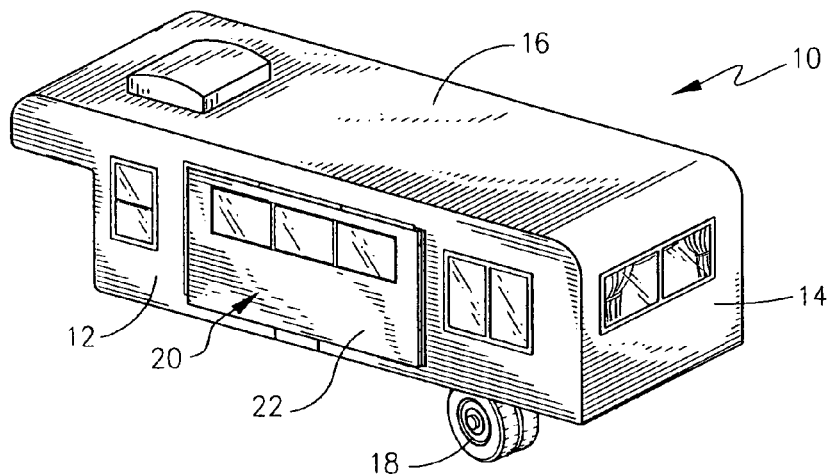
FIGS. 1(*a*) and 1(*b*) are perspective views of a habitat in the form of a recreational vehicle trailer employing and extendible bay according to the present invention with the bay being shown in a retracted position in FIG. 1(*a*) and in an extended position in FIG. 1(*b*)
Figure 1B:
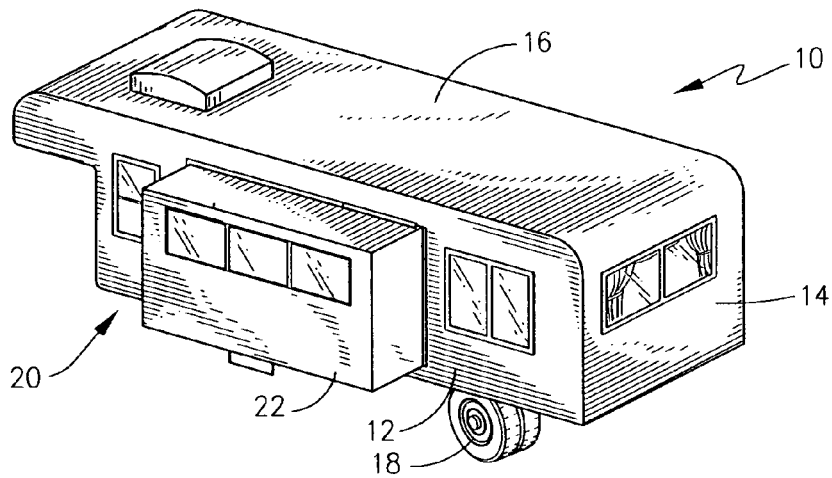

With reference first the FIGS. 1(a) and 1(b), a gooseneck trailer 10 is shown as a representative of a habitat/recreational vehicle with which the present extendible bay assembly may be employed. As is illustrated in these figures, trailer 10, then, includes a pair of sides, such as side 12, an end 14 and a top 16 with trailer 10 being adapted to be towed by a vehicle so that it may roll on suitable wheels 18. Extendible bay assembly 20 is illustrated in FIG. 1(a) in a retracted position so that a front portion 22 thereof is relatively flush against side 12. In FIG. 1(b), extendible bay assembly 20 is shown in the extended position so that it may expand the living space within trailer 10. In the expanded position, front portion 22 is spaced outwardly of side 12 a distance based upon its particular construction.

With reference to FIGS. 2 and 3, it should be appreciated that the extendible bay assembly 20 is adapted to be received in an opening 30 in sidewall 12. Here, it may be seen that opening 30 has a lower edge 32, an upper edge 34, and first and second side edges 36 and 38 that extend between the upper and lower edges 34 and 32. An upper sealing strip 44 extends along upper edge 34, and side-sealing strips 46 and 48 extend along side edges 36 and 38, respectively. A recess 40 is also formed in side 12 of trailer 10 to accommodate a drive assembly, as described more thoroughly below.

According to the present invention, a majority of the perimeter of opening 30 is provided with bearings, each in the form of an elongated roller to support the compartment that forms part of the extendible bay assembly. Thus, as is shown in FIGS. 2 and 3, lower edge 32 is provided with an elongated lower edge bearing element 52 and upper edge 34 is provided with an upper edge bearing element 54. Likewise, side edges 36 and 38 are respectively provided with side edge bearing elements 56 and 58.

Figure 4:
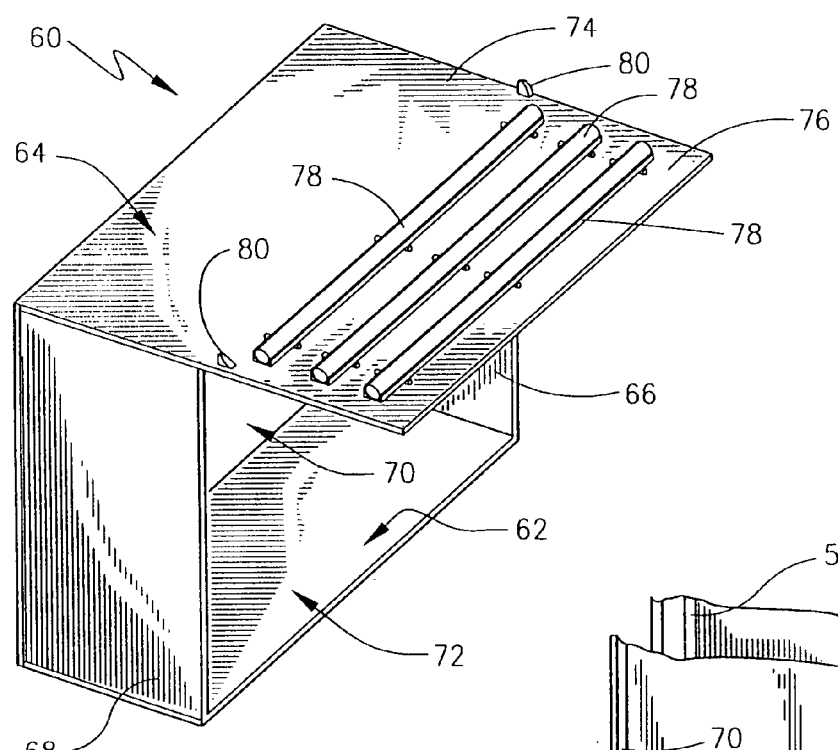
FIG. 4 is a top and rear perspective view of the compartment used in the extendible bay of the present invention.

Opening 30 is adapted to receive a compartment 60 when in an assembled state, with compartment 60 being introduced in FIG. 4. Here, it may be seen that compartment 60 includes a bottom 62 a top 64 a front panel 70 and first and second spaced apart side panels 66 and 68. Side panels 66 and 68 extend from front panel 70 to define a compartment depth. Thus, a dimension between the first and second side panels 66 and 68 define a compartment width and a dimension between the top and bottom define a compartment height. Accordingly, compartment 60 has an interior 72 that provides additional living space for the habitat.

Top 64 is constructed as a flat top panel 74 that includes a cantilever portion 76 that extends a distance beyond the depth of side panels 66 and 68, as is illustrated in FIG. 4. In this exemplary embodiment, this cantilever portion 76 is formed as an integral, one-piece extension of top 64. Naturally, other cantilever structures are within the scope of the present invention. In any event, at least one but preferably a plurality of cantilever bearing elements 78 extend for a majority of the width of cantilever portion 76 with cantilever bearing element 78 being elongated members that are in generally parallel, spaced apart relation. Limit stop blocks 80 are also provided proximate to the junction of cantilever portion 76 with top 64 of compartment 60.

Figure 5:
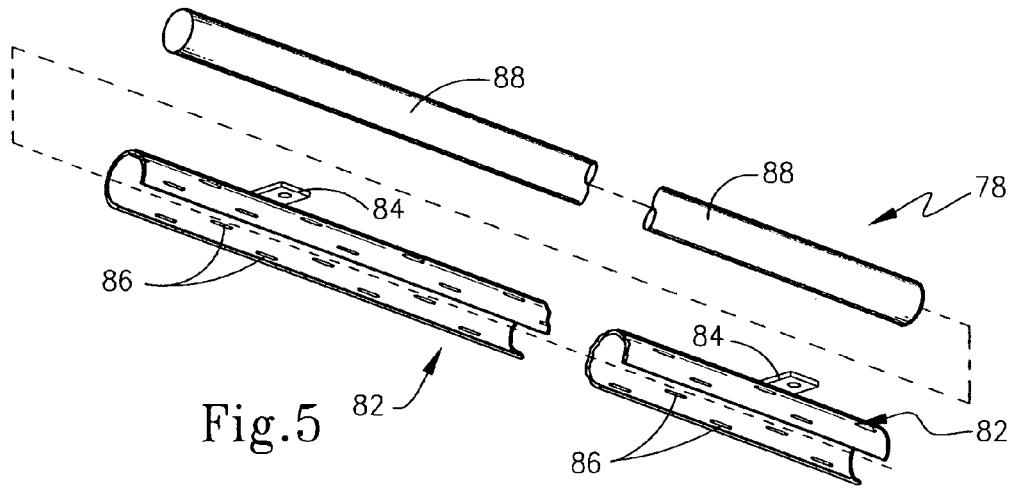
FIG. 5 is an exploded view in perspective showing a representative bearing element used to support the compartment of FIG. 4 according to the present invention.

The structure of cantilever bearing elements 78 is illustrated in FIGS. 5 and 6(a) and 6(b). In FIG. 5, it may be seen that a representative cantilever bearing element 78 includes an elongated channel frame 82 that is in the form of a partial cylindrical shell that is provided with mounting flanges 84. A plurality of roller bearings 86 are mounted for free rotation in channel piece 82, and it should be understood that these roller bearings are oriented along roller axis that are parallel to the central longitudinal axis of channel piece 82. However, it should be understood that other types of bearings, such as ball bearings and the like, may be employed.

In any event, as is illustrated in FIGS. 5 and 6(a), an elongated cylindrical rod 88 rotatably received in the channeled frame 82 so that bearings 86 interface the channel frame 82 and cylindrical rod 88. Here, cylindrical rod 88 is a solid cylinder of plastic material, such as nylon, polyoxymethylene (i.e. Delrin®), or fiberglass, aluminum or steel. Accordingly, the ordinarily skilled artisan will appreciate that rod 88 is freely rotatable about an axis "A" that extends longitudinally of bearing element 78. FIGS. 6(b) shows an alternative structure of bearing 78 so that here bearing 78' includes a channel frame 82 having bearings 86 that support a cylindrical, hollow tube 88' instead of rod 88. Rod 88' can again rotate with respect to central longitudinal axis "A". This construction allows for reduced weight provided that the plastic material used to form tube 88' is sufficiently rigid and has sufficient structural strength to support the compartment 60.

While the structure of FIGS. 5, 6(a) and 6(b) have been undertaken in describing the structure of cantilever bearings 78 or 78', it should be appreciated that the structure of lower edge bearing element 52, upper edge bearing element 54 and side bearing elements 56 and 58 may be constructed similarly in the exemplary embodiment of the present invention. Accordingly, no further detailed description of bearing elements 52, 54, 56 and 58 is provided. However, it should be understood that modification to these bearing elements, as well as to cantilever bearing elements 78 may be made by the ordinarily skilled person this field of invention without departing the inventive scope. Accordingly, the bearing means around the opening 30 supports the compartment relative to the opening for sliding movement out of and into the habitat. It is only essential that these bearing elements be sufficient to support the compartments motion with reduced friction. These bearing elements could be slides, rollers, glides and the like. They should non-bindingly permit the sliding motion and help position the compartment during the sliding motion. Likewise, the cantilever bearing means, illustrated in the form of cantilever bearing elements 70 and 70' may be any suitable structure that allows the cantilever portion to be slideably supported relative to the sealing of the habitat, as described below, with reduced friction and in a non-binding manner. Again, a wide variety of bearings may be used, as well as slides or glides to accomplish this purpose.

With reference now to FIGS. 7(a) and 7(b), the sliding movement and support of compartment 60 may be appreciated in greater detail. Here, FIGS. 7(a) and 7(b) respectively show extendible bay assembly 20 mounted in RV trailer 10. In the retracted state, shown in FIG. 7(a), it may be seen that compartment 60 is in a retracted position wherein front 70 is relatively flush with side 12. Bottom 62 is supported by lower edge bearing element 52 while top 64 is supported against upper edge bearing element 54. Likewise, the sides of compartment 60 are supported against side bearings, such as bearing 56. In addition, it may be seen that cantilever portion 76 is supported against ceiling 90 by cantilever bearing elements 78, as described above. Bottom 62 is supported against floor 92 by a bottom bearing element 94 which is constructed similarly to cantilever bearing element 78 so that structure is not again repeated. However, it should be understood that bottom-bearing element 94 extends a majority of the distance across the width of compartment 60. In the retracted position, shown in FIG. 7(a), it may be seen that the sealing strips, such as upper sealing strip 44 extends over the junction of front 70 and trailer 10 so as to prevent the ingress of water, debris and the like, as is known in the art.

Compartment 60 may be moved from the retracted position shown in FIG. 7(a) to the extended position shown in FIG. 7(b). Top 64 thus advances until limit stop blocks 80 abut the side of the trailer 10 with cantilever bearing elements 70 rolling along sealing 90 and with bottom bearing element 94 rolling along floor 92. Lower limit stop blocks 96 may be provided on bottom 62 to work in conjunction with limit stop blocks 80 to limit the outward extension of compartment 60 from trailer 10. During this movement, sealing strips, such as upper sealing strip 44 wipes against the surface of compartment 60, again to provide a seal. When the process is reversed, the sealing strips help remove water or debris from the top 64 of compartment 60.

From this description, it may be appreciated by the skilled person in the art that compartment 60 is supported substantially completely around its perimeter by the edge bearing elements while downward tipping is prevented by cantilever portion 76 and bearing elements 78 acting against sealing 90. Bottom bearing element 94 facilitates the rolling motion against floor 92. In this manner, the prior art structure used to support extendible bays along their bottom are eliminated and there are no brackets that may be twisted or deformed to cause jamming, binding and the like.

While the structure shown in FIGS. 7(a) and 7(b) may provide and extendible bay structure that can be operated manually, so that a person simply slides the extendible bay assembly 20 into and out of the trailer in a drawer-like manner, it is preferred due to the weight of large bay assemblies contemplated by this invention that a drive assembly be employed to allow mechanical advancement of compartment 60 into the extended position and the mechanical advancement of compartment 60 from the extended position back to the retracted position.

Figure 8A:
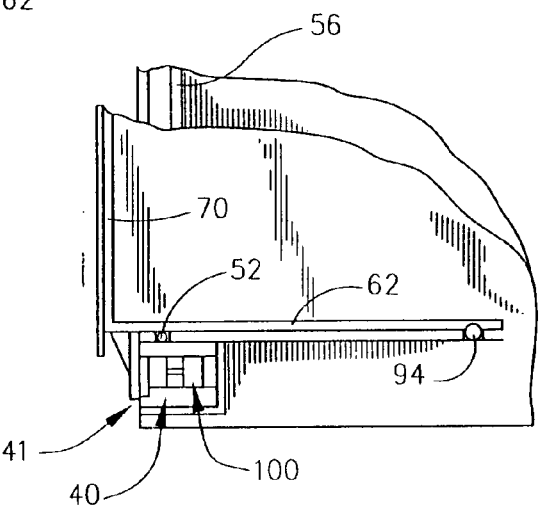
FIG. 8(*a*) is an end view in partial cross-section showing a mechanical drive that may be used with the extendible bay of the present invention with the extendible bay in the retracted position, and FIG. 8(*b*) is an end view in cross-section, similar to FIG. 8(*a*) but showing the extendible bay being mechanically driven to the extended position.
Figure 8B:
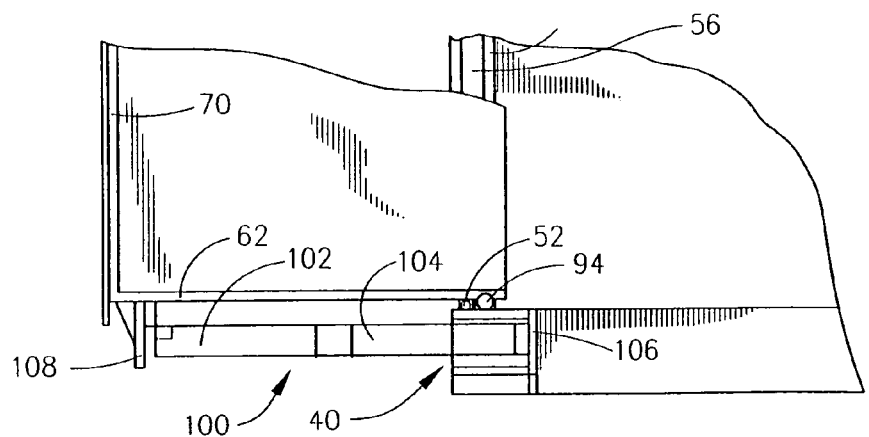
Figures 9, 10, 11, 12:
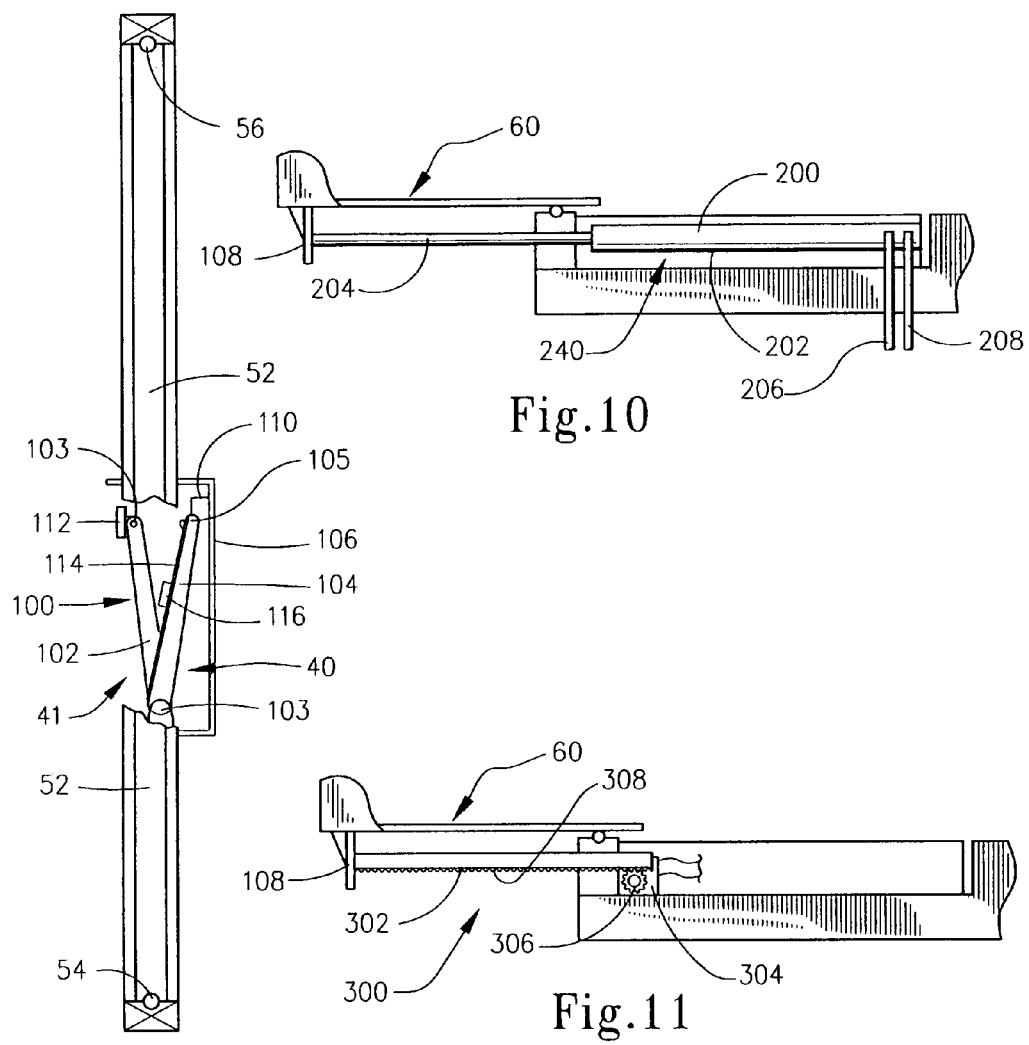
FIG. 9 is a top plan view showing the mechanical drive assembly according to a first exemplary embodiment of the present invention used in FIGS. 8(*a*) and 8(*b*)
FIG. 10 is a side view in partial cross-section showing a hydraulic drive according to the present invention.
FIG. 11 is a side view in partial cross-section showing a rack and pinion drive for the extendible bay of the present invention.
FIG. 12 is a side view in partial cross-section showing a screw drive according to the present invention.

A first exemplary embodiment of such a mechanical drive is illustrated in FIGS. 8(a) and 8(b) and in FIG. 9. Here, a compartment, such as compartment 40 is provided to house a mechanical drive 100. Mechanical drive 100, in this embodiment, is an articulating arm drive including two arm sections 102 and 104. Such an articulating arm is of a type disclosed in my co-pending U.S. patent application Ser. No. 10/699,243, filed Oct. 30, 2003, the disclosure of which is specifically incorporated herein by reference. One or more of such articulating arm drives may be used, depending upon the size of the bay assembly. In any event, articulating arm drive 100 has one end secured to a base plate 106 with the other end secured to a drive bracket 108 that is mounted on the lower surface of bottom 62 proximately to front 70. Drive bracket 108 is configured, also, to be received in the entryway 41 of recess 40 and substantially encloses the recess to project the contracted drive assembly disposed therein when the extendible bay assembly is in the retracted state, as illustrated in FIG. 8(a).

The structure of this articulating arm drive 100 is shown in greater detail in FIG. 9, where it may be seen that arm sections 102 and 104 are pivotally secured to one another at a hinge 103. Mounting bracket 110 secures to base plate 106 and pivotally connects end 105 of arm 104 thereto. End 103 of arm 102 is pivotally secured to a mounting plate 112 that, in turn, is securable to drive bracket 108. Arm 104 carries a drive shaft 114 that is operated by a motor 116 so as to turn against rigid gears located at ends 105 and at hinge 103 to extend and retract the mechanical arm drive. This structure is shown in complete detail in my above reference patent application that is incorporated herein.

It is well within the scope of the present invention to provide other drive assemblies. In FIG. 10, a hydraulic drive 200 includes a drive cylinder 202 mounted in a recess 240, and a piston rod 204 is reciprocally driven by hydraulic fluid from hydraulic lines 206 and 208. The outer end of drive rod 204 is securable to drive bracket 108 so that is may reciprocate compartment 60 between the extended and retracted positions. FIG. 11 shows a rack and pinion drive 300 wherein a rack gear 302 has one end secured to drive bracket 108. A motor 304 carries a gear 306 that interacts with teeth 308 on rack gear 302 so that reversibly driving motor 304 moves compartment 60 between the extended and the retracted positions. Finally, FIG. 12 shows a screw drive 400 which includes a worm gear 402 having one end secured to drive bracket 108 with the other end threadably received by a drive gear 404 that is turned by a power gear 406 driven by motor 408. Thus, again, reversing motor 408 will extend and retract the compartment 60 of the extendible bay assembly.

From the foregoing, also, it should be appreciated that the present invention also contemplates a method of supporting a compartment for sliding movement between a retracted position and an extended position wherein the compartment is mounted in the opening of a recreational vehicle or other habitat. This method may include any of the steps that are inherent in the mechanical structures described above. In its broad form, the method includes the step of providing a cantilever structure associated with the top of the compartment so that the cantilever structure extends alongside the ceiling of the vehicle and the step of slideably supporting the cantilever structure against the ceiling as the compartment is moved between the extended and retracted positions.

More particularly, additional steps may be included, if desired, with this basic method. Here, the step of slideably supporting the cantilever structure may be accomplished by rollably supporting the cantilever structure relative to the ceiling. The method may include the step of rollably supporting the bottom of the compartment relative to the lower edge of the opening and/or the step of rollably supporting the first and second side panels of the compartment relative to the first and second side edges of the opening. The method may also include the step of rollably supporting the bottom of the compartment relative to the floor of the vehicle. Finally, the method may include the step of mechanically driving the compartment between the extended and retracted positions.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. The extendable bay assembly for a human habitat that includes a ceiling and an upright side wall, said side wall having an opening therein which has a lower edge, an upper edge and first and second side edges extending between the upper and lower edges, comprising:
   (A) a compartment sized and adapted to be received in the opening in said side wall when in an assembled state, said compartment having a compartment interior and including a bottom, a top, a front panel and first and second spaced-apart side panels extending from said front panel to define a compartment depth with a dimension between said first and second side panels defining a compartment width and a dimension between said top and bottom defining a compartment height, said top including a cantilever portion extending a distance beyond the first and second side panels;
   (B) a lower edge bearing element interposed between the lower edge of the opening and the bottom of said compartment when said compartment is in the assembled state and operative to support said compartment relative to the lower edge of the opening for sliding movement out of and into said habitat; and
   (C) a cantilever bearing element interposed between the cantilever portion of said top and the ceiling of said habitat when said compartment is in the assembled state and operative to support said cantilever portion against the ceiling for sliding movement between a retracted position wherein said compartment is stored in the habitat and an extended position wherein said compartment extends outwardly of said habitat.

2. The extendable bay assembly according to claim 1 including a drive assembly associated with said compartment and said habitat and operative to move said compartment between the retracted and extended positions.

3. The extendable bay assembly according to claim 2 wherein said drive assembly is selected from a group consisting of: an articulating arm drive, a hydraulic drive, a rack and pinion drive and a screw drive.

4. The extendable bay assembly according to claim 1 wherein said compartment is rectangular in configuration such that said first and second side panels are in substantially parallel relationship to one another.

5. The extendable bay assembly according to claim 1 including an upper seal strip extending along an upper edge of the opening and positioned to slideably engage said top as said compartment is moved between the retracted and extended positions.

6. The extendable bay assembly according to claim 1 including first and second side seal strips extending, respectively, along first and second side edges of the opening and positioned, respectively, to slideably engage said first and second side panels as said compartment is moved between the retracted and extended positions.

7. The extendable bay assembly according to claim 1 wherein said lower edge bearing element extends along a majority of the compartment width.

8. The extendable bay assembly according to claim 1 wherein said cantilever bearing element extends along a majority of the compartment width.

9. The extendable bay assembly according to claim 1 including first and second side edge bearing elements interposed, respectively, between said first and second side panels and the first and second side edges of the opening when said compartment is in the assembled state and operative to support said compartment relative to the first and second side edges of the opening for sliding movement out of and into said habitat.

10. The extendable bay assembly according to claim 9 wherein said first and second side bearing elements each extend for a majority of the compartment height.

11. The extendable bay assembly according to claim 1 including a plurality of cantilever bearing elements.

12. The extendable bay assembly according to claim 11 wherein each of said cantilever bearing elements is elongated and extends along a majority of the compartment width, said upper cantilever bearing elements being in substantially parallel spaced-apart relation to one another.

13. The extendable bay assembly according to claim 1 wherein said cantilever bearing element includes an elongated channel frame, an elongated cylindrical rod rotatably received in said channel frame and a plurality of bearings interfacing said channel frame and said rod.

14. The extendable bay assembly according to claim 13 wherein said rod is constructed of a plastic material.

15. The extendable bay assembly according to claim 1 wherein said top is defined by a flat top panel.

16. The extendable bay assembly according to claim 15 wherein said cantilever portion is formed as an integral one-piece extension of said top panel.

17. The extendable bay assembly according to claim 1 including an upper edge bearing element interposed between the upper edge of the opening and the top of said compartment when said compartment is in the assembled state and operative to support said compartment relative to the upper edge of the opening for sliding movement out of and into said habitat.

18. The extendable bay assembly according to claim 1 including a bottom bearing element disposed on the bottom of said compartment in spaced relation to said front and operative to support said compartment for sliding movement out of and into said habitat.

19. An extendable bay assembly for a human habitat that includes a ceiling and an upright side wall, said side wall having an opening therein which has a lower edge, an upper edge and first and second side edges extending between the upper and lower edges, comprising:
   (A) a lower edge bearing element disposed at the lower edge of the opening;
   (B) an upper edge bearing element disposed at the upper edge of the opening;
   (C) first and second side edge bearing element respectively disposed at the first and second side edges of the opening;
   (D) a compartment sized and adapted to be received in the opening in said side wall when in an assembled state and supported by said lower edge bearing element, said upper edge bearing element and said first and second side edge bearing elements for sliding movement out of and into said habitat, said compartment having a compartment interior and including
      (1) a bottom,
      (2) a top spaced-apart from said bottom to define a compartment height,
      (3) a front panel and
      (4) first and second spaced-apart side panels extending between said top and bottom and rearwardly from said front to define a compartment depth with a dimension between said first and second side panels defining a compartment width, said top including a cantilever portion extending a distance beyond the first and second side panels;

(E) a bottom bearing element disposed on the bottom of said compartment in spaced relation to said front and operative to support a rear portion of said compartment for sliding movement out of and into said habitat;

(F) a cantilever bearing element disposed on the cantilever portion of said top and operative to support said cantilever portion against the ceiling for sliding movement between a retracted position wherein said compartment is stored in the habitat and an extended position wherein said compartment extends outwardly of said habitat; and (G) a drive assembly associated with said compartment and said habitat and operative to move said compartment between the retracted and extended positions.

20. The extendable bay assembly according to claim 19 including an upper seal strip extending along an upper edge of the opening and positioned to slideably engage said top as said compartment is moved between the retracted and extended positions.

21. The extendable bay assembly according to claim 19 including first and second side seal strips extending, respectively, along first and second side edges of the opening and positioned, respectively, to slideably engage said first and second side panels as said compartment is moved between the retracted and extended positions.

22. The extendable bay assembly according to claim 19 wherein said drive assembly is selected from a group consisting of: an articulating arm drive, a hydraulic drive, a rack and pinion drive and a screw drive.

23. The extendable bay assembly according to claim 19 wherein said lower edge bearing element is mounted on a lower edge portion of the opening and extends along a majority of the compartment width, wherein said upper edge bearing element is mounted on an upper edge portion of the opening and extends along a majority of the compartment width and wherein said first and second side edge bearing elements are respectively mounted on first and second side edge portions of the opening and extend along a majority of the compartment height.

24. The extendable bay assembly according to claim 19 wherein said cantilever bearing element extends along a majority of the compartment width.

25. The extendable bay assembly according to claim 24 including a plurality of cantilever bearing elements each disposed on the cantilever portion of said top and extending along a majority of the compartment width in generally parallel spaced-apart relation to one another and operative to support said cantilever portion against the ceiling for sliding movement between the retracted position and the extended position.

26. The extendable bay assembly according to claim 19 wherein each of said edge bearing elements includes an elongated channel frame, an elongated cylindrical rod rotatably received in said channel frame and a plurality of bearings interfacing said channel frame and said rod.

27. The extendable bay assembly according to claim 19 wherein said cantilever bearing element and said bottom bearing element each includes an elongated channel frame, an elongated cylindrical rod rotatably received in said channel frame and a plurality of bearings interfacing said channel frame and said rod.

28. The extendable bay assembly according to claim 19 wherein said top is defined by a flat top panel, said cantilever portion being formed as an integral one-piece extension of said top panel.

29. An extendable bay assembly for a human habitat that includes a ceiling and an upright side wall, said side wall having an opening therein which has a lower edge, an upper edge and first and second side edges extending between the upper and lower edges, comprising:

(A) a compartment sized and adapted to be received in the opening in said side wall when in a assembled state, said compartment having a compartment interior and including a bottom, a top, a front panel and first and second spaced-apart side panels extending rearwardly from said front panel to define a compartment depth with a dimension between said first and second side panels defining a compartment width and a dimension between said top and bottom defining a compartment height, said top including a cantilever portion extending a distance beyond the first and second side panels;

(B) edge bearing means for supporting said compartment relative to the opening for sliding movement out of and into said habitat;

(C) cantilever bearing means for supporting said cantilever portion against the ceiling for sliding movement between a retracted position wherein said compartment is stored in the habitat and an extended position wherein said compartment extends outwardly of said habitat; and (D) drive means for moving said compartment between the retracted and extended positions.

30. An extendable bay assembly according to claim 29 upper sealing means for slideably engaging said top and side seal means for slideably engaging said first and second side panel as said compartment is moved between the retracted and extended positions.

31. In a recreational vehicle including a ceiling, a floor and an upright side wall having an opening therein adapted to receive a slide-out bay which opening has a lower edge, an upper edge and first and second side edges, the improvement comprising a compartment sized and adapted to be received in the opening in said side wall for sliding movement out of and into said habitat, said compartment having a compartment interior and including a bottom, a top spaced-apart from said bottom to define a compartment height, a front panel and first and second spaced-apart side panels extending between said top and bottom and rearwardly from said front panel to define a compartment depth with a dimension between said first and second side panels defining a compartment width, said top including a cantilever portion extending a distance beyond the first and second side panels, an upper cantilever bearing element interposed between the cantilever portion of said top and the ceiling of said vehicle when said compartment is position in the opening and operative to support said cantilever portion against the ceiling for sliding movement between a retracted position wherein said compartment is stored in the vehicle and an extended position wherein said compartment extends outwardly of said vehicle.

32. The improvement according to claim 31 further including a drive assembly associated with said compartment and said habitat and operative to move said compartment between the retracted and extended positions.

33. The improvement according to claim 32 wherein said drive assembly is selected from a group consisting of: an articulating arm drive, a hydraulic drive, a rack and pinion drive and a screw drive.

34. The improvement according to claim 32 wherein the side wall of the vehicle includes a recess therein having an entryway, said drive assembly disposed in the recess.

35. The improvement according to claim 34 including a drive bracket disposed on said compartment, said drive assembly secured to said drive bracket.

36. The improvement according to claim 35 wherein said drive bracket is configured to be received in the entryway thereby to enclose said drive assembly in the recess.

37. The improvement according to claim 31 including a lower edge bearing element interposed between the lower edge of the opening and the bottom of said compartment when said compartment is in the assembled state and operative to support said compartment relative to the lower edge of the opening for sliding movement out of and into said vehicle.

38. The improvement according to claim 31 including an upper edge bearing element interposed between the upper edge of the opening and the top of said compartment when said compartment is in the assembled state and operative to support said compartment relative to the upper edge of the opening for sliding movement out of and into said vehicle.

39. The improvement according to claim 31 including first and second side edge bearing elements respectively interposed between the first and second side edges of the opening and the first and second side panels of said compartment when said compartment is in the assembled state and operative to support said compartment relative to the lower edge of the opening for sliding movement out of and into said vehicle.

40. The improvement according to claim 31 including a bottom bearing element disposed on the bottom of said compartment in spaced relation to said front and operative to support said compartment against the floor of the vehicle for sliding movement between the extended and retracted positions.

41. In a recreational vehicle including a ceiling, a floor and an upright side wall and having an opening in the side wall that has a lower edge, an upper edge and first and second side edges so as to be adapted to receive a slide-out compartment that has a top, a bottom, a front panel and a pair of spaced-apart side panels, a method of supporting said compartment for sliding movement between a retracted position and an extended position comprising:

(A) providing a cantilever structure associated with the top of said compartment so that said cantilever structure extends alongside the ceiling of the vehicle; and (B) slideably supporting said cantilever structure against the ceiling as said compartment is moved between the retracted and extended positions.

42. The method according to claim 41 wherein the step of slideably supporting said cantilever structure is accomplished by rollably supporting the cantilever structure relative to the ceiling.

43. The method according to claim 41 including the step of rollably supporting the bottom of said compartment relative to the lower edge of the opening.

44. The method according to claim 41 including the step of rollably supporting the first and second side panels of said compartment relative to the first and second side edges of the opening, respectively.

45. The method according to claim 41 including the step of rollably supporting the bottom of said compartment relative to the floor of the vehicle.

46. The method according to claim 41 including the step of mechanically driving the compartment between the extended and retracted positions.

* * * * *